(No Model.)
E. BOWMAN.
VEHICLE SPRING.
No. 352,675. Patented Nov. 16, 1886.
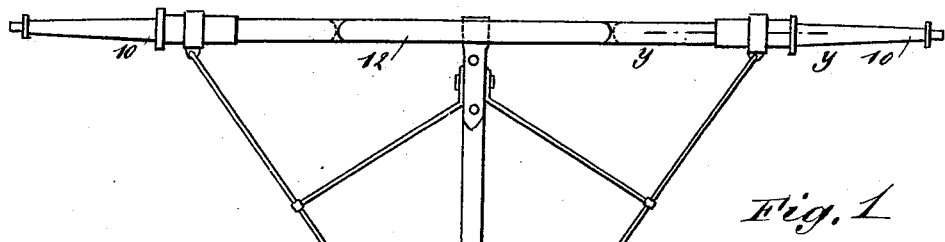
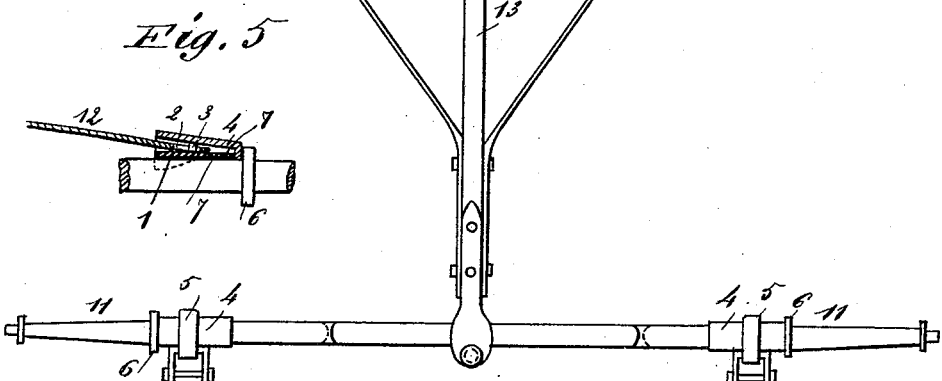
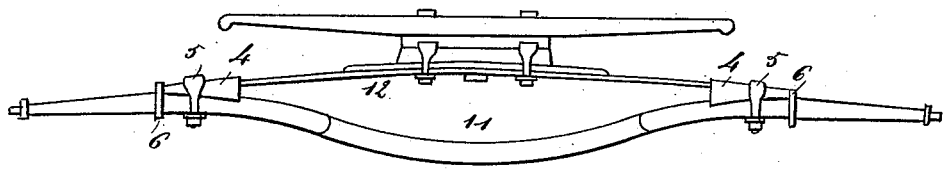
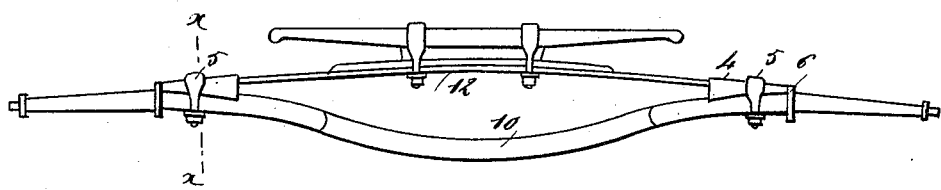
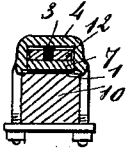
WITNESSES:
C. Neveux
C. Sedgwick
INVENTOR:
E. Bowman
BY Munn & Co.
ATTORNEYS.

UNITED STATES PATENT OFFICE.

EDWARD BOWMAN, OF SANTA CRUZ, CALIFORNIA.

VEHICLE-SPRING.

SPECIFICATION forming part of Letters Patent No. 352,675, dated November 16, 1886.

Application filed June 16, 1886. Serial No. 205,344. (No model.)

*To all whom it may concern:*

Be it known that I, EDWARD BOWMAN, of Santa Cruz, in the county of Santa Cruz and State of California, have invented a new and Improved Vehicle-Spring, of which the following is a full, clear, and exact description.

My invention relates to the construction of a vehicle-spring and its supporting attachment, as will be hereinafter more fully explained, and specifically pointed out in the claim.

Reference is to be had to the accompanying drawings, forming a part of this specification, in which similar figures of reference indicate corresponding parts in all the figures.

Figure 1 is a plan view of a vehicle running-gear constructed in accordance with the terms of my invention, the wheels, however, being removed. Fig. 2 is a front view of the same. Fig. 3 is a rear view. Fig. 4 is an enlarged cross-sectional view taken on line $x$ $x$ of Fig. 3; and Fig. 5 is a longitudinal sectional view representing the end of the spring and its supporting attachment, the section being taken on line $y$ $y$ of Fig. 1.

In the drawings, 10 and 11 represent the rear and forward axles, which are bent down centrally, as shown best in Figs. 2 and 3. In connection with each of the axles I arrange springs 12, that are connected to the axle in a peculiar and novel manner, which will presently be specifically described, the reach 13 being arranged as clearly shown. In the ends of each spring there are formed longitudinal slots 2, and in these slots ride pins 3, which project downward from the under side of the upper wall of a socket, 4, which said socket is secured to the axle by means of a clip, 5, the outer end of the socket abutting against the collar 6 of the axle, as clearly shown. Between the spring and the axle there are interposed a plate, 7, and a rubber washer, 1, said plate being made of brass or other soft metal.

The construction described enables me to mount the vehicle body and seat as low as would be required in practice, and this, too, without any additional expense for ironing. In fact I am able to hang a spring-buckboard as low as it would be possible to mount a dead-axle buckboard—that is, a buckboard without springs—with the ordinary form of gear.

It will be seen from the arrangement described that the heavier a vehicle is loaded the nearer toward the center is the bearing of the spring, thus increasing the rigidity of the spring in proportion to the amount of load carried; and it will also be seen that the rubber washer will prevent all rattling, and that the brass or other soft metal interposed between the spring and axle will prevent all wear of either the spring or the axle, such wear being taken up by the interposed strip, which may be renewed as often as is required.

Having thus fully described my invention, what I claim as new, and desire to secure by Letters Patent, is—

The combination, with an axle, of a spring having slots in its ends, the socket 4, provided with the downwardly-projecting pins 3, the wearing-plate 7, and the washer 1, interposed between the wearing-plate and axle, and the clip 5, for securing the socket to the axle, substantially as shown and described.

EDWARD BOWMAN.

Witnesses:
A. W. BURNHAM,
F. W. THOMPSON.